(12) United States Patent
Tomiya

(10) Patent No.: US 7,842,893 B2
(45) Date of Patent: Nov. 30, 2010

(54) ELECTRONIC PEN HAVING AN ULTRASONIC WAVE CONTROLLER

(75) Inventor: Shu Tomiya, Tokyo (JP)

(73) Assignee: NEC Viewtechnology, Ltd., Tokyo (JP)

( * ) Notice: Subject to any disclaimer, the term of this patent is extended or adjusted under 35 U.S.C. 154(b) by 1204 days.

(21) Appl. No.: 11/452,252

(22) Filed: Jun. 14, 2006

(65) Prior Publication Data

US 2007/0046654 A1    Mar. 1, 2007

(30) Foreign Application Priority Data

Aug. 23, 2005    (JP) .............................. 2005-241297

(51) Int. Cl.
*G06F 3/033*    (2006.01)
(52) U.S. Cl. .................. 178/19.02; 178/19.01; 345/156; 345/179
(58) Field of Classification Search .................. 345/156, 345/173, 175, 177, 179; 178/18.01, 18.03, 178/18.04, 18.09, 19.01, 19.02, 19.05
See application file for complete search history.

(56) References Cited

U.S. PATENT DOCUMENTS

| | | | |
|---|---|---|---|
| 4,814,552 A * | 3/1989 | Stefik et al. ............... | 178/19.02 |
| 5,517,579 A * | 5/1996 | Baron et al. ................ | 382/187 |
| 5,717,168 A * | 2/1998 | DeBuisser et al. ....... | 178/18.04 |
| 6,335,723 B1 * | 1/2002 | Wood et al. ................. | 345/173 |
| 6,628,270 B2 * | 9/2003 | Sekiguchi et al. ........... | 345/173 |
| 6,628,271 B1 * | 9/2003 | Matsumoto et al. ......... | 345/179 |
| 6,732,270 B1 * | 5/2004 | Patzer et al. ................ | 713/170 |
| 6,982,697 B2 * | 1/2006 | Wilson et al. ............... | 345/156 |
| 7,185,987 B2 * | 3/2007 | Tamura ....................... | 353/42 |
| 7,205,984 B2 | 4/2007 | Fujiwara et al. | |
| 7,489,308 B2 * | 2/2009 | Blake et al. ................. | 345/173 |

(Continued)

FOREIGN PATENT DOCUMENTS

CN    1605927    4/2005

(Continued)

OTHER PUBLICATIONS

Chinese Office Action dated Aug. 3, 2007 with English translation.
Japanese Office Action dated Mar. 17, 2010 with a partial English translation thereof.

*Primary Examiner*—My-Chau T Tran
(74) *Attorney, Agent, or Firm*—McGinn Intellectual Property Law Group, PLLC

(57) ABSTRACT

The present invention aims to provide an electronic pen that is able to prevent the reflection of an ultrasonic wave. An electronic pen according to the present invention has: a housing having a longitudinal axis and a write side tip along the longitudinal axis; at least an ultrasonic wave transmitter, the ultrasonic wave transmitter being arranged near the write side tip of the housing; and a controller for detecting a sensor orientation and for controlling transmission of the ultrasonic wave. The sensor orientation is an index that shows a rotational orientation of the housing about the longitudinal axis, the rotational orientation being directed at an ultrasonic wave sensor for receiving the ultrasonic wave that is transmitted from the ultrasonic wave transmitter. The controller selectively activates a part of the ultrasonic wave transmitter such that the ultrasonic wave is transmitted from the orientation which is directed to the sensor orientation.

6 Claims, 7 Drawing Sheets

U.S. PATENT DOCUMENTS

| | | | |
|---|---|---|---|
| 7,524,069 B2 * | 4/2009 | Murayama et al. | 353/69 |
| 2004/0032399 A1 * | 2/2004 | Sekiguchi et al. | 345/173 |
| 2005/0083301 A1 * | 4/2005 | Tamura | 345/158 |

FOREIGN PATENT DOCUMENTS

| | | |
|---|---|---|
| JP | 11-203043 | 7/1999 |
| JP | 11-237950 | 8/1999 |
| JP | 11-345077 | 12/1999 |
| JP | 2004-151789 | 5/2004 |
| JP | 2004-192199 | 7/2004 |

* cited by examiner

RELATED ART

RELATED ART

RELATED ART

ELECTRONIC PEN HAVING AN ULTRASONIC WAVE CONTROLLER

The present application is based on, and claims priority from, J.P. Application No. 2005-241297, filed Aug. 23, 2005, the disclosure of which is hereby incorporated by reference herein in its entirety.

BACKGROUND OF THE INVENTION

1. Field of the Invention

The present invention relates to an electronic pen, an electronic whiteboard system, and a projector system, and in particular, relates to a mechanism of an electronic pen for transmitting an ultrasonic wave.

2. Description of the Related Art

An electronic whiteboard system using an ultrasonic wave and an infrared ray is widely used. FIG. 1 is a schematic diagram illustrating the configuration of a conventional electronic whiteboard system. Electronic whiteboard system 101 includes electronic pen 102, ultrasonic wave sensors 3a, 3b, infrared ray sensors 4a, 4b, and coordinate calculator 5 that is connected to ultrasonic wave sensors 3a, 3b and infrared ray sensors 4a, 4b. Ultrasonic wave sensors 3a, 3b and infrared ray sensors 4a, 4b are provided on writing surface S such as a screen, a wall, or a whiteboard. Ultrasonic wave sensor 3a and infrared ray sensor 4a are arranged in pairs adjacent to each other at corner 6a of writing surface S. Similarly, ultrasonic wave sensor 3b and infrared ray sensor 4b are arranged in pairs adjacent to each other at corner 6b.

FIG. 2 is a schematic view of a conventional electronic pen. Electronic pen 102 is a pen-shaped transmission device that is provided with elongate housing 20 having longitudinal axis C. Ultrasonic wave transmitter 121 and infrared ray transmitter 122 are arranged near write side tip 124 of housing 20 and transmit an ultrasonic Wave and an infrared ray in a concentric pattern, respectively. Therefore, ultrasonic wave sensors 3a, 3b and infrared ray sensors 4a, 4b can receive an ultrasonic wave and an infrared ray while a user holds electronic pen 102 in a usual manner without paying attention to the orientation of electronic pen 102 around longitudinal axis C. The configuration of such an electronic pen is disclosed in Japanese Patent Laid-Open Publication No. 2004-192199 and No. 237950/99. Further, Japanese Patent Laid-Open Publication No. 203043/99 discloses an electronic pen having ultrasonic wave transmitters that are provided at the same intervals around the longitudinal axis thereof. In the present specification, the term "orientation" indicates an angle or a rotational orientation of an electronic pen about the longitudinal axis thereof.

When the tip of electronic pen 102 is pressed against writing surface S, an ultrasonic wave and an infrared ray are simultaneously transmitted from ultrasonic wave transmitter 121 and infrared ray transmitter 122, respectively. FIG. 3 is a cross-sectional view taken along line 3-3 in FIG. 2. An ultrasonic wave and an infrared ray travel in a concentric circle pattern from the tip of electronic pen 102, as shown by the dashed lines in FIG. 3. Ultrasonic wave sensors 3a, 3b receive the ultrasonic wave, which is shown by the dashed lines in FIG. 1 and are extended from the tip of electronic pen 102. Infrared ray sensors 4a, 4b receive an infrared ray, which is shown by the chain lines FIG. 1 and are extended from the tip of electronic pen 102. FIG. 4 is a conceptual diagram explaining the difference in the arriving time of an infrared ray and an ultrasonic wave. Infrared ray, which is light, instantaneously reaches infrared ray sensor 4a (or 4b). On the other hand, an ultrasonic wave, which is an acoustic wave and travels slower than an infrared ray, reaches ultrasonic wave sensor 3a (or 3b) after the infrared ray reaches infrared ray sensor 4a. Coordinate calculator 5 measures time lag t1, which is the difference between the time at which the ultrasonic wave is received and the time at which the infrared ray is received, and calculates distance D1 (see FIG. 1) between corner 6a and (the tip of) electronic pen 102 based on time lag t1. The same process is carried out by infrared ray sensor 3b and ultrasonic wave sensor 4b to calculate distance D2 (see FIG. 1) between corner 6b and (the end of) electronic pen 102. Coordinate calculator 5 determines the coordinate of electronic pen 102 relative to a predetermined reference point based on the principle of triangulation by using distances D1, D2 that are calculated. Since the ultrasonic wave and the infrared ray are transmitted intermittently at a regular interval, as shown in FIG. 4, textual or graphic information, which is written on the writing surface by electronic pen 102, can be reproduced as electronic data by connecting the coordinates that have been determined.

In recent years, an electronic whiteboard system, or a projector system that is provided with an ultra-short focal length projector having a mirror optical system, as shown in FIGS. 5A and 5B, has been developed. FIG. 5A is a schematic diagram of a projector system viewed from the front of a screen, and FIG. 5B is a schematic diagram viewed from the side of the screen. Projector 67 has infrared ray sensor 65 and ultrasonic wave sensors 66a, 66b. Projector 67 also has a coordinate calculator, not shown, to calculate three-dimensionally the distance between electronic pen 62 on screen 61 and projector 67, based on the difference between the time at which infrared ray pulse 63, which is transmitted from electronic pen 62, is received by infrared ray sensor 65 and the time at which ultrasonic wave pulses 64a, 64b are received by ultrasonic wave sensors 66a, 66b, and on the distance between projector 67 and screen 61, which is measured by projector 67. Since infrared ray sensor 65 and ultrasonic wave sensors 66a, 66b are arranged on projector 67 adjacent to each other, which is different from the example in FIG. 1, a single infrared ray sensor 65 may be enough to provide a reference time to measure the difference between the arriving time of the infrared ray and the arriving time of the ultrasonic wave. An electronic whiteboard system of this type has the advantage that no screen is needed, and that a wall etc. in a room can be used, if practical, because ultrasonic wave sensors and an infrared ray sensor are provided in a projector. Further, no means is required to connect the ultrasonic wave sensor/infrared ray sensor to a personal computer. See Japanese Patent Laid-Open Publication No. 2005-115870 for details of such an electronic whiteboard system.

However, since the ultrasonic wave that is transmitted from the ultrasonic wave transmitter travels concentrically, actually in three dimensions, there is the possibility that the ultrasonic wave that is transmitted in directions other than the direction of the ultrasonic wave sensor is reflected by an object and reaches the ultrasonic wave sensor as a reflected wave. As a result, an electronic whiteboard system, which detects the coordinate of a pen under the condition that an ultrasonic wave directly reaches the ultrasonic wave sensor from the ultrasonic wave transmitter along a straight line, cannot detect the coordinate accurately due to the reflected wave. For example, if an ultrasonic wave that is reflected reaches the ultrasonic wave sensor with delay, and, at the same time, the next ultrasonic wave that is transmitted later reaches the ultrasonic wave sensor along a straight line, then there is the possibility that an ultrasonic wave pulse that is to be detected cannot be recognized correctly. A similar problem may also occur when a pulse of ultrasonic wave reaches the ultrasonic wave sensor along a straight line, then the ultrasonic wave that is reflected reaches the ultrasonic wave sensor, and then the next pulse reaches the ultrasonic wave sensor along a straight line. In this case, the reflected wave is erroneously recognized as the next pulse of the ultrasonic wave that will reach the ultrasonic wave sensor. In a conventional electronic whiteboard system, as shown in FIG. 1, the influence of a reflected wave can be reduced by attaching a canopy to the ultrasonic wave sensor to provide the ultrasonic wave sensor with directivity, because ultrasonic wave sensor is provided on the approximately same plane as the screen. However, a canopy will increase the size of the ultrasonic wave sensor, as well as the cost. On the other hand, in an electronic whiteboard system or a projector system using an ultra-short focal length projector, as shown in FIG. 5, it is difficult to provide an ultrasonic wave sensor with directivity by using a canopy, because the ultrasonic wave sensor is arranged away from the screen, or the projection surface. In an electronic whiteboard system, it is difficult to provide an ultrasonic wave sensor with directivity for a specific direction, because the distance between the projector and the projection surface differs depending on the size of the image that is to be projected.

SUMMARY OF THE INVENTION

An object of the present invention is to provide an electronic pen, an electronic whiteboard system, and a projector system that are able to prevent the reflection of an ultrasonic wave that is transmitted from an ultrasonic wave transmitter, in order to improve accuracy with which the coordinate of an electronic pen is calculated, particularly for an electronic pen for which it is difficult to provide an ultrasonic wave sensor with directivity.

An electronic pen according to the present invention comprises: a housing having a longitudinal axis and a write side tip along the longitudinal axis; at least an ultrasonic wave transmitter, the ultrasonic wave transmitter being arranged near the write side tip of the housing; and a controller for detecting a sensor orientation and for controlling transmission of the ultrasonic wave. The sensor orientation is an index that shows a rotational orientation of the housing about the longitudinal axis, the rotational orientation being directed at an ultrasonic wave sensor for receiving the ultrasonic wave that is transmitted from the ultrasonic wave transmitter. The controller selectively activates a part of the ultrasonic wave transmitter such that the ultrasonic wave is transmitted from the orientation which is directed to the sensor orientation.

An ultrasonic wave is transmitted in all directions from the ultrasonic wave transmitter. Therefore, the ultrasonic wave that is transmitted in directions other than the direction of the ultrasonic wave sensor may be reflected by the surrounding floor, walls, or obstacles and may reach the ultrasonic wave sensor later than the ultrasonic wave that directly reaches the ultrasonic wave sensor. However, an electronic pen according to the present invention detects the sensor orientation of the pen, and prevents or limits the transmission of the ultrasonic wave in directions other than the direction of the ultrasonic wave sensor. As a result, the transmission of an ultrasonic wave, which is reflected by the surrounding floor, walls, or obstacles and reaches the ultrasonic wave sensor, can be reduced.

According to another embodiment of the present invention, an electronic whiteboard system comprises: the electronic pen mentioned above; at least two ultrasonic wave sensors that are configured to be arranged apart from each other on a writing surface, information being written on the writing surface by the electronic pen; infrared ray sensors for receiving the infrared ray, the infrared ray sensors being configured to be arranged adjacent to respective ultrasonic wave sensors on the writing surface; and a coordinate calculator for calculating coordinates of the electronic pen on the writing surface by calculating a difference between a time at which the infrared ray is received by the infrared ray sensor and a time at which the ultrasonic wave is received by the ultrasonic wave sensor for each pair of the infrared ray sensors and the ultrasonic wave sensors.

According to yet another embodiment of the present invention, a projector system comprises: the electronic pen mentioned above; wherein the electronic pen further comprises an infrared ray transmitter for transmitting an infrared ray in synchronization with transmission of the ultrasonic wave that is transmitted by said ultrasonic wave transmitter; and a projector apparatus which is configured to project an image onto a writing surface, information being written on the writing surface by the electronic pen. The projector apparatus includes; at least two ultrasonic wave sensors; at least one infrared ray sensor for receiving the infrared ray, the infrared ray sensor being arranged adjacent to each ultrasonic wave sensor; and a coordinate calculator for calculating three-dimensional coordinates of the electronic pen by calculating a difference between a time at which the infrared ray is received by the infrared ray sensor and a time at which the ultrasonic wave is received by the ultrasonic wave sensor for each ultrasonic wave sensor.

As explained above, according to the present invention, since the transmission of an ultrasonic wave in directions away from the direction of the ultrasonic wave sensor is prevented or limited, the coordinates of an electronic pen can be calculated with more accuracy.

The above and other objects, features and advantages of the present invention will become apparent from the following description with reference to the accompanying drawings which illustrate examples of the present invention.

DESCRIPTION OF THE PREFERRED EMBODIMENTS (First Embodiment)

Figure 1:
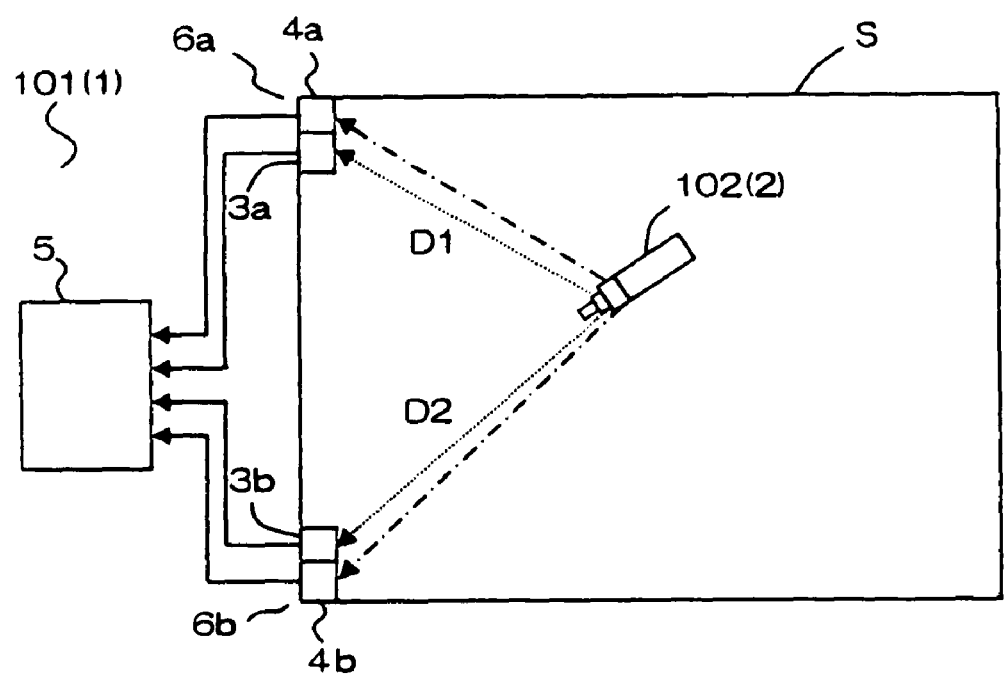
FIG. 1 is a schematic diagram illustrating the configuration of a conventional electronic whiteboard system.
Figure 2:
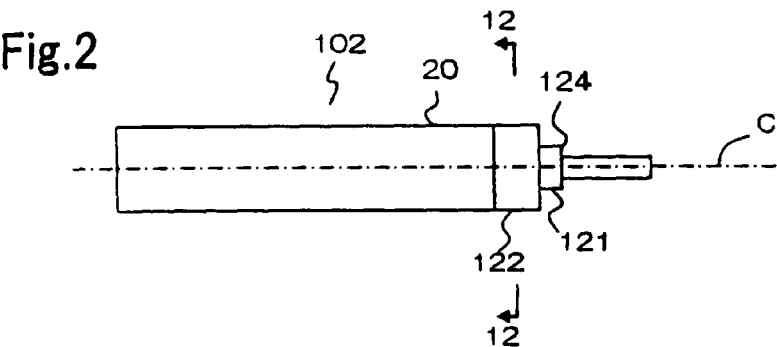
FIG. 2 is a schematic view of a conventional electronic pen.
Figure 3:
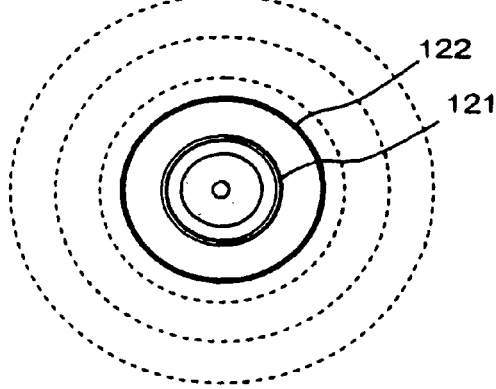
FIG. 3 is a conceptual diagram showing the transmission of an ultrasonic wave and an infrared ray which are transmitted from the electronic pen.
Figure 4:
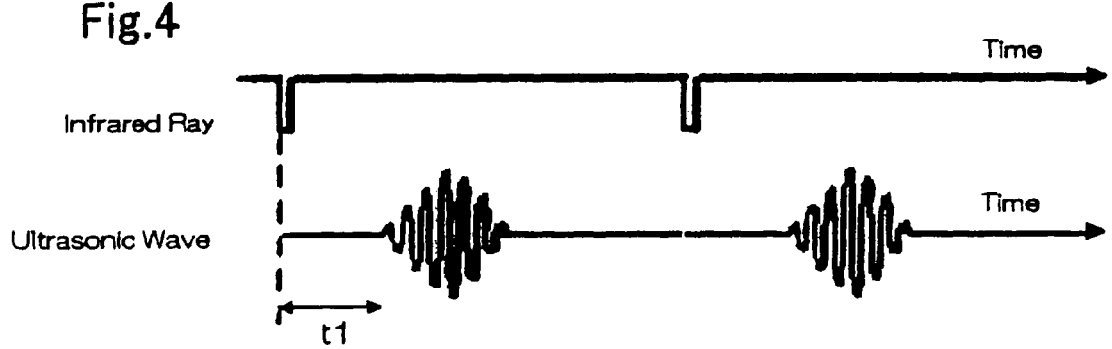
FIG. 4 is a conceptual diagram showing the difference of arriving times of an infrared ray and an ultrasonic wave.

An electronic whiteboard system of the present invention is similar to a conventional electronic whiteboard system except for the configuration of the electronic pen. Specifically, referring to FIG. 1, electronic whiteboard system 1 has electronic pen 2, at least two ultrasonic wave sensors 3a, 3b, infrared ray sensors 4a, 4b, and coordinate calculator 5. Ultrasonic wave sensors 3a, 3b are arranged apart from each other at corners 6a, 6b on the left side of writing surface S, on which information is written by electronic pen 2. Infrared sensors 4a, 4b for receiving an infrared ray are arranged adjacent to respective ultrasonic wave sensors 3a, 3b on writing surface S. Coordinate calculator 5, which is connected to ultrasonic wave sensors 3a, 3b and infrared ray sensors 4a, 4b, calculates distance D1 between corner 6a and electronic pen 2 based on the difference between the time at which an infrared ray is received by infrared ray sensor 4a and the time at which an ultrasonic wave is received by ultrasonic wave sensor 3a. Similarly, coordinate calculator 5 calculates distance D2 between corner 6b and electronic pen 2 based on the difference between the time at which an infrared ray is received by infrared ray sensor 4b and the time at which an ultrasonic wave is received by ultrasonic wave sensor 3b. Coordinate calculator 5 further calculates the coordinates of electronic pen 2 on writing surface S using distances D1, D2. Refer to the description of the related art and FIGS. 3 and 4 for details of the operation.

Figure 6:
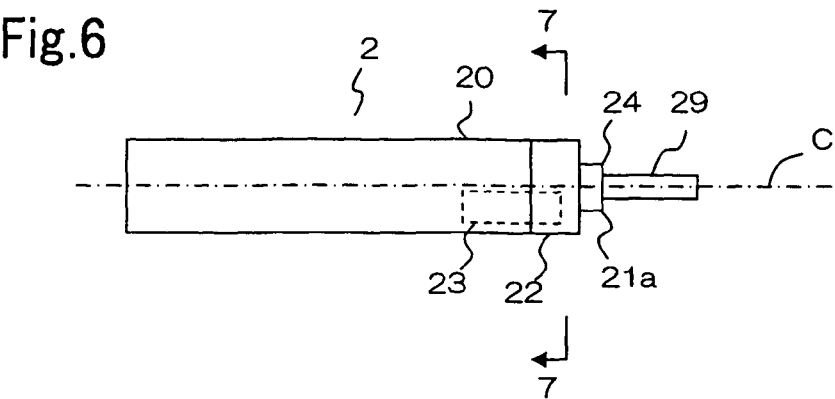
FIG. 6 is a schematic view of an electronic pen according to a first embodiment of the present invention.

FIG. 6 is a schematic view of an electronic pen. Electronic pen 2 has an elongate cylindrical housing 20 having longitudinal axis C, ultrasonic wave transmitters 21a-21d (only 21a is shown in FIG. 6) for transmitting an ultrasonic wave, and infrared ray transmitter 22 for transmitting an infrared ray. Controller 23 is provided in housing 23. Pointer 29 is provided at tip 24 of the writing side of housing 20. Ultrasonic wave transmitters 21a-21d are connected to controller 23.

Figure 7:
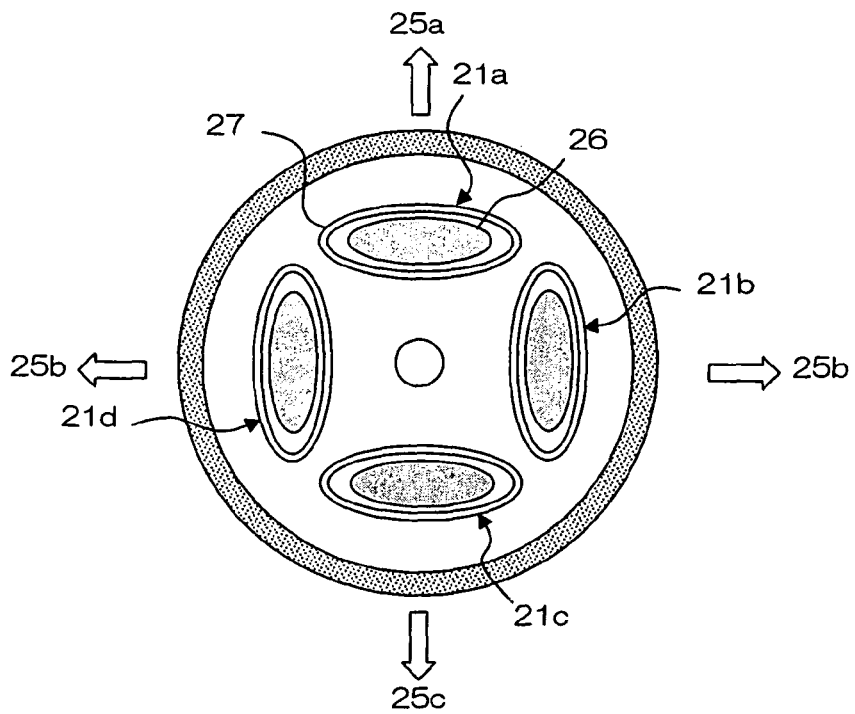
FIG. 7 is a cross-sectional view of the electronic pen taken along line 7-7 in FIG. 6 according to the first embodiment of the present invention.

FIG. 7 is a cross-sectional view near the tip portion of the electronic pen taken along line 7-7 in FIG. 6. Ultrasonic wave transmitters, or ultrasonic wave transmitter units 21a-21d are arranged at intervals of 90° near tip 24 of the writing side of housing 20 at orientations 25a-25d around longitudinal axis C of electronic pen 2. The number of ultrasonic wave transmitters is not limited to four, as in the present embodiment. Similarly, the configuration of the ultrasonic wave transmitter is not limited, as long as it is small-size and is able to produce an ultrasonic wave. As an example, an ultrasonic wave transmitter may have vibrator 26, which is made of a piezoelectric element, and vibrating plate 27a that surrounds vibrator 26. Infrared ray transmitter 22, which is arranged coaxially with ultrasonic wave transmitters 21a-21d near tip 24 of the writing side of electronic pen 2, transmits an infrared ray in synchronization with the transmission of an ultrasonic wave that is transmitted by ultrasonic wave transmitters 21a-21d.

Figure 8:
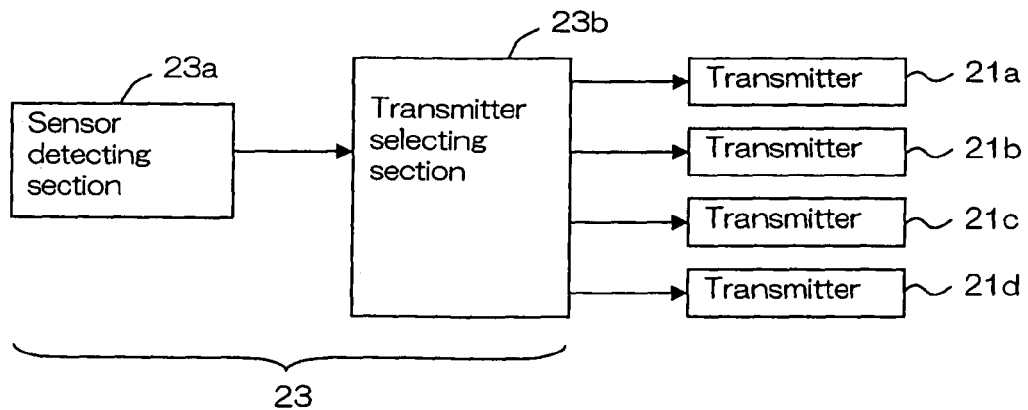
FIG. 8 is a block diagram of major components of the electronic pen shown in FIG. 6 which are related to the transmission of an ultrasonic wave.

FIG. 8 is a block diagram of major components of the electronic pen which are related to the transmission of an ultrasonic wave. Controller 23 includes sensor detecting section 23a and transmitter selecting section 23b. Sensor detecting section 23a detects the orientation of electronic pen 2 that is directed at ultrasonic wave sensors 3a, 3b. The orientation, or sensor orientation, is an angle or rotational orientation of electronic pen 2 about longitudinal axis C of housing 20, and shows the orientation in which ultrasonic wave sensors 3a, 3b are positioned about electronic pen 2 when a user holds electronic pen 2 with his hand. Sensor detecting section 23a may have, but is not limited to, the combination of a ball, not shown, that is free to move in a space, not shown, inside housing 20 along a plane that is orthogonal to longitudinal axis C of housing 20, and a plurality of sensors, not shown, for detecting the contact with the ball. Sensor detecting section 23a further has a section, not shown, for performing the function of determining the orientation of the electronic pen. This function, which will be described later, may also be performed by transmitter selecting section 23b or by coordinate calculator 5 instead of sensor detecting section 23a. Transmitter selecting section 23b selectively triggers a part of ultrasonic wave transmitters which are positioned in the direction near ultrasonic wave sensors 3a, 3b.

Figure 9:
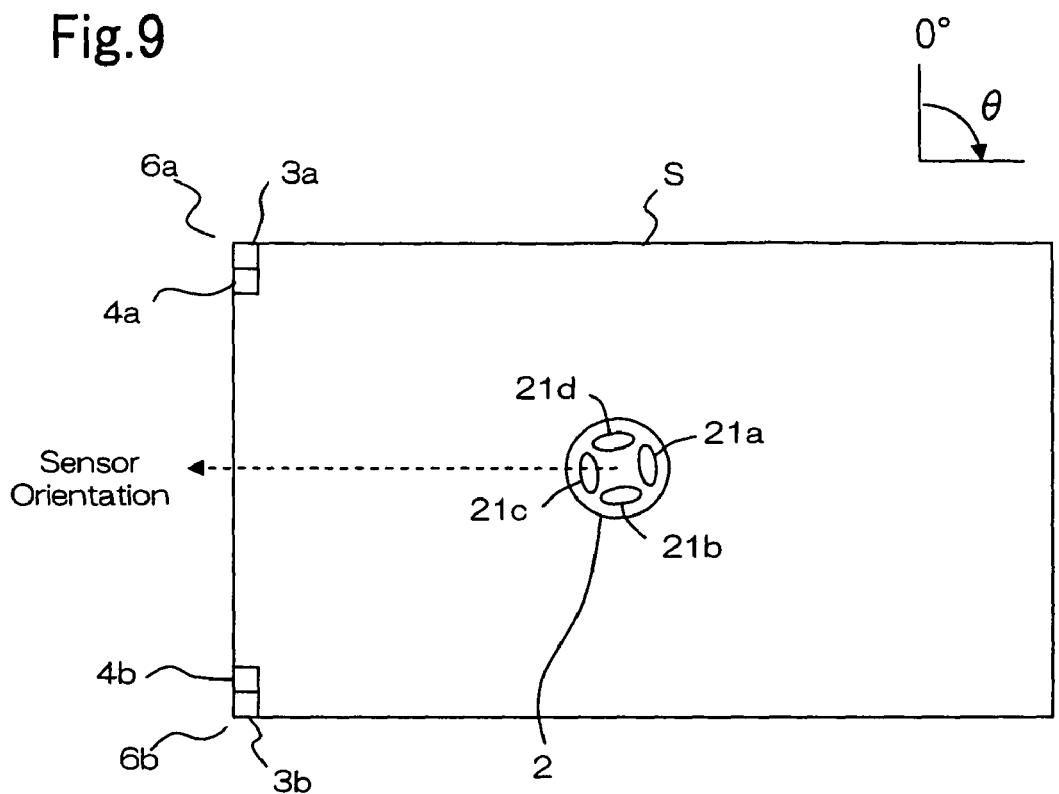
FIG. 9 is a conceptual view showing the operation of the electronic pen shown in FIG. 6.

The operation of controller 23 will be further explained in detail. It is assumed that writing surface S is an approximately vertical plane (screen, wall, or the like). Referring to FIG. 9, ultrasonic wave sensors 3a, 3b are provided at corners 6a, 6b of writing surface S. For the sake of convenience, angle θ is defined clockwise with the vertically upward direction being 0°. Since ultrasonic wave sensors 3a, 3b are arranged in the directions of corners 6a, 6b, which are on the upper left side and on the lower left side of writing surface S, the position of the ultrasonic wave sensors 3a, 3b is represented by 270° so that an ultrasonic wave is received by both ultrasonic wave sensors 3a, 3b. The information on the position of ultrasonic wave sensors 3a, 3b is inputted to electronic pen 2 in advance. However, since ultrasonic wave sensors 3a, 3b are not always arranged on the left side, as is described above, the information on the position of the ultrasonic wave sensors may be manually set to, for example, 0°, 90°, 180°, or 270° by a user.

Sensor detecting section 23a is triggered when a user presses electronic pen 2 against writing surface S while securely holding electronic pen 2 at a desired orientation. Alternatively, sensor detecting section 23a may be triggered when pointer 29 detects pressure that is larger than a predetermined value. Sensor detecting section 23a having the above-mentioned structure operates as follows. When the ball moves to 180° side, sensor detecting section 23a determines the orientation at which electronic pen 2 is directed at 180° by analyzing the response of the sensors near the ball. In FIG. 9, sensor detecting section 23a judges that the orientation that is near ultrasonic wave transmitter 21b is directed at 180°. Then, sensor detecting section 23a determines the orientation at which electronic pen 2 is directed at the ultrasonic wave sensor based on the information on the orientation of electronic pen 2 that is determined and on the position of the ultrasonic wave sensors that is mentioned above. In FIG. 9, sensor detecting section 23a judges that the orientation that is directed at ultrasonic wave sensors 3a, 3b is the orientation that is further rotated clockwise by 90° from the vicinity of ultrasonic wave transmitter 21b. In other word, sensor detecting section 23a judges that ultrasonic wave sensors 3a, 3b are positioned in the vicinity of ultrasonic wave transmitter 21c. In this way, sensor detecting section 23a detects which ultrasonic wave transmitter is closely directed at the ultrasonic wave sensors.

Transmitter selecting section 23b receives the result from sensor detecting section 23a and triggers only ultrasonic wave transmitter 21c. In other words, transmitter selecting section 23b controls ultrasonic wave transmitters 21a-21d such that ultrasonic wave transmitters 21a, 21b, 21d, which are positioned relatively away from the direction of ultrasonic wave sensors 3a, 3b, are not triggered in order to prevent an ultrasonic wave from being transmitted by ultrasonic wave transmitters 21a, 21b, 21d. Accordingly, it is possible to prevent the transmission of an ultrasonic wave in undesired directions, and thereby to reduce the influence of an ultrasonic wave that is reflected by a wall or the like.

(Second Embodiment)

Figure 10:
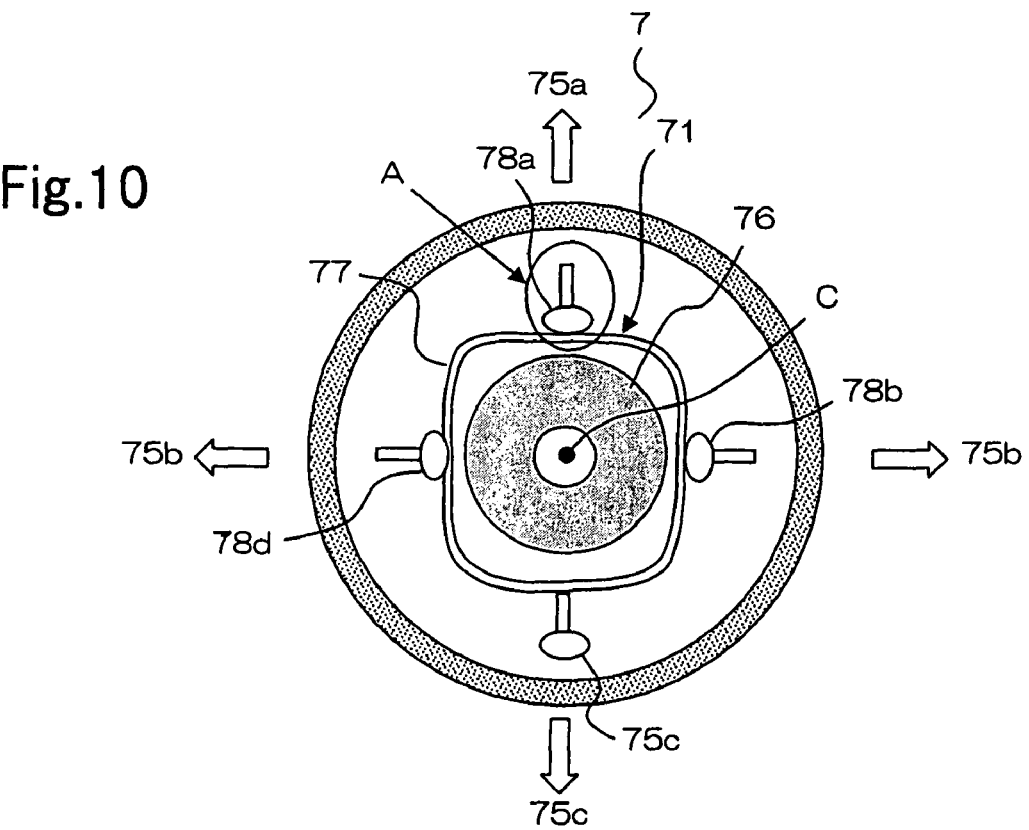
FIG. 10 is a cross-sectional view near the tip portion of the electronic pen according to a second embodiment of the present invention, viewed from the tip of the writing side.

The second embedment is similar to the first embodiment except for the configuration of the ultrasonic wave transmitters and the controller. FIG. 10 is a cross-sectional view of an electronic pen near the tip portion, viewed from the tip of the writing side. One ultrasonic wave transmitter 71 is provided around longitudinal axis C near the tip of the writing side of electronic pen 7. In the illustrated embodiment, ultrasonic wave transmitter 71 includes vibrator 76 that is arranged coaxially with longitudinal axis C of electronic pen 7 and vibrating plate 77 that surrounds vibrator 76.

Figure 11:
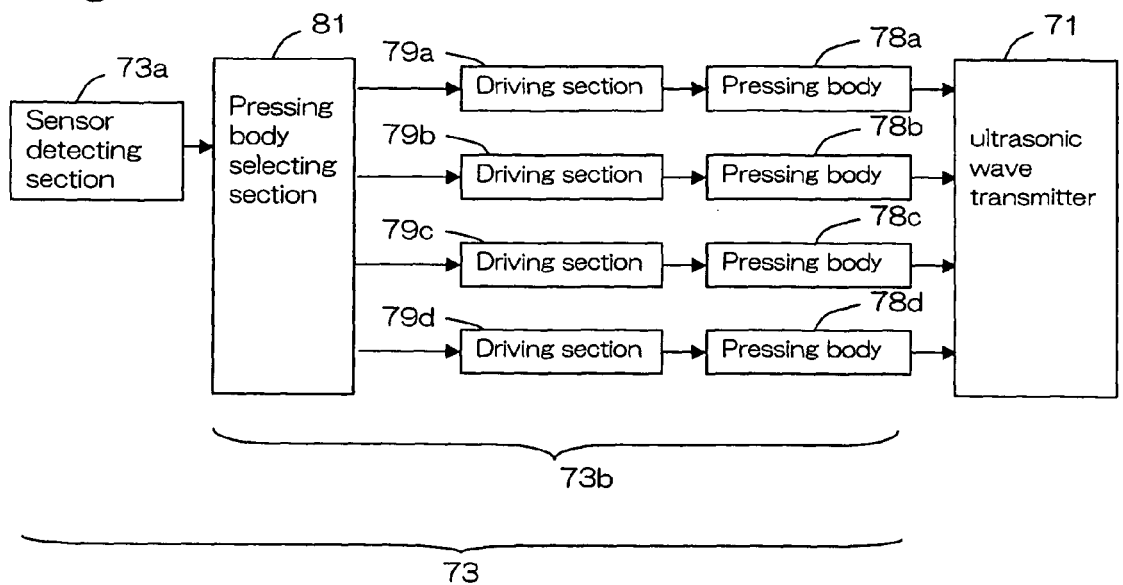
FIG. 11 is a block diagram of major components of the electronic pen shown, in FIG. 10 which are related to the transmission of an ultrasonic wave.

FIG. 11 is a block diagram of major components of the electronic pen which are related to the transmission of an ultrasonic wave. Controller 73 includes sensor detecting section 73a for detecting the orientation of electronic pen 7 that is directed at ultrasonic wave sensors 3a, 3b, and ultrasonic wave limiter 73b. Sensor detecting section 73a has a configuration similar to that of sensor detecting section 23a in the first embodiment. Ultrasonic wave limiter 73b includes pressing bodies 78a-78d, pressing body selecting section 81, and pressing body driving sections 79a-79d. Each pressing body driving section is associated with the corresponding pressing body. Pressing bodies 78a-78d are provided around ultrasonic wave transmitter 71 at intervals of 90° and at orientations 75a-75d, as shown in FIG. 10. Pressing body selecting section 81 selects the pressing bodies that are away from the directions of ultrasonic wave sensors 3a, 3b, which are detected by sensor detecting section 73a. Pressing body driving sections 79a-79d drive the pressing body which is selected. Pressing body driving sections 79a-79d are connected to pressing body selecting section 81. The number of pressing bodies and the number of pressing body driving sections are not limited to four, as in the present embodiment.

Figure 12:
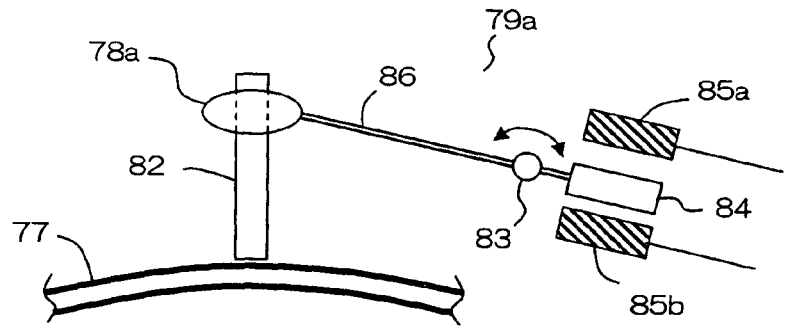
FIG. 12 is an enlarged view of portion A in FIG. 10, showing a state in which a pressing body does not press the ultrasonic wave transmitter.
Figure 13:
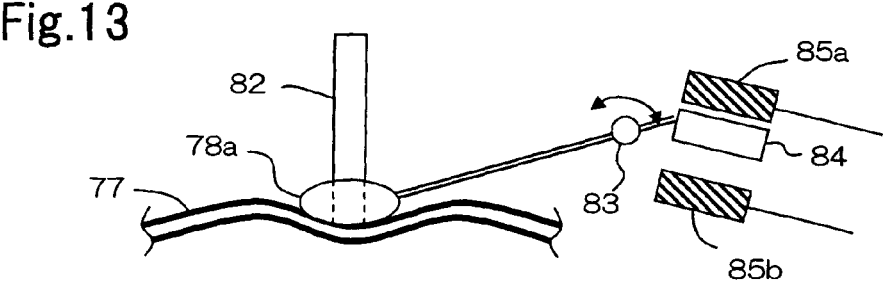
FIG. 13 is an enlarged view of portion A in FIG. 10, showing a state in which the pressing body presses the ultrasonic wave transmitter.

FIGS. 12 and 13 are partial enlarged views of portion A in FIG. 10. FIG. 12 shows a state in which the pressing body does not press the ultrasonic wave transmitter, and FIG. 13 shows a state in which the pressing body presses the ultrasonic wave transmitter. The explanation will be focused on pressing body 78a and pressing body driving section 79a, because the configuration and the operation of the other pressing bodies and pressing body driving sections are similar to that of pressing body 78a and pressing body driving section 79a. Pressing body 78a is guided in the radial direction of electronic pen 7 by slit 82. Pressing body driving section 79a has shaft 86, which is connected to pressing body 78a at one end and is connected to permanent magnet 84 at the other end and which is rotatably supported at pivot 83, and electromagnets 85a, 85b that are arranged on both sides of permanent magnet 84. Permanent magnet 84 is moved in accordance with the direction of current that flows in electromagnets 85a, 85b, which depends on the signal from pressing body selecting section 81. As a result, pressing body 78a is moved along slit 82 between the released position shown in FIG. 12 and the pressing position shown in FIG. 13. In this way, pressing body driving section 79a mechanically limits the vibration of a part of ultrasonic wave transmitter 71. In FIG. 10, pressing bodies 78a, 78b, 78d press the corresponding portions of ultrasonic wave transmitter 71 to limit the vibration, and the transmission of an undesired ultrasonic wave, which may be transmitted from pressing bodies 78a, 78b, 78d at any of their orientations, is prevented.

In this way, according to the second embodiment, a part of ultrasonic wave transmitter 71 is mechanically pressed, and the vibration of the portions which are pressed is limited. Accordingly, the magnitude of an ultrasonic wave that is generated in the pressed portions is reduced, leading to reduction in the influence of a reflected wave.

(Third Embodiment)

Figure 14:
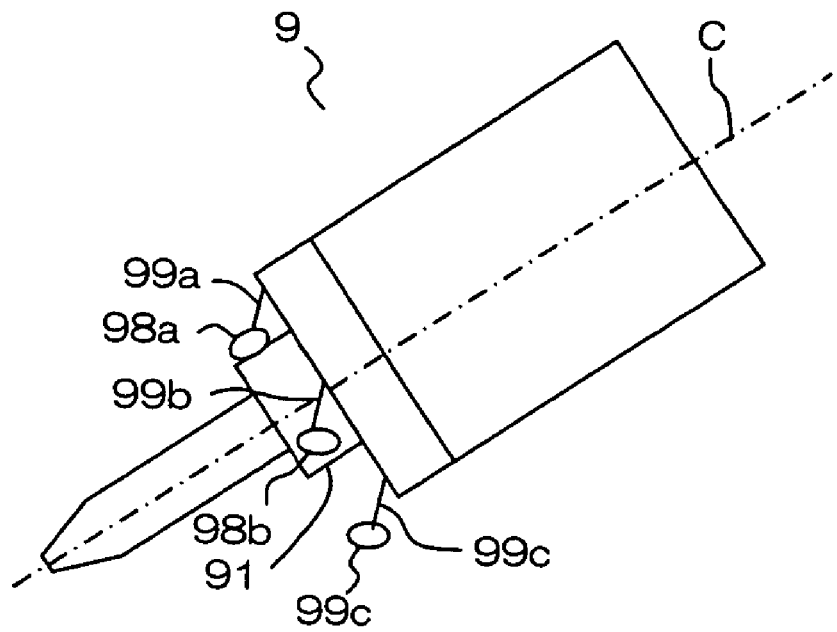
FIG. 14 is a side view of an end portion of an electronic pen according to a third embodiment of the present invention showing a configuration around the ultrasonic wave transmitter.

The third embodiment is similar to the second embodiment except for the configuration of the controller of the electronic pen. Specifically, the third embodiment is different from the second embodiment in that it utilizes gravity to press the pressing bodies. FIG. 14 is a side view of the tip portion of an electronic pen illustrating the configuration around an ultrasonic wave transmitter. Ultrasonic wave transmitter 91 is provided around longitudinal axis C near write side tip 94 of electronic pen 9. The controller includes a plurality of pressing bodies 98a-98d, which are arranged around ultrasonic wave transmitter 91 at intervals of 90°, and supporting members 99a-99d for supporting pressing bodies 98a-98d. Pressing body 98d and supporting member 99d are omitted in the drawing. Supporting members 99a-99d have pendulums, and pressing bodies 98a-98d are free to move in the vertically downward direction by virtue of gravity. Since four pressing bodies 98a-98d are arranged at the same intervals of 90°, at least one pressing body that is positioned at the orientation near the vertically upward direction presses the ultrasonic wave transmitter, regardless of the orientation of electronic pen 9.

Figure 5A:
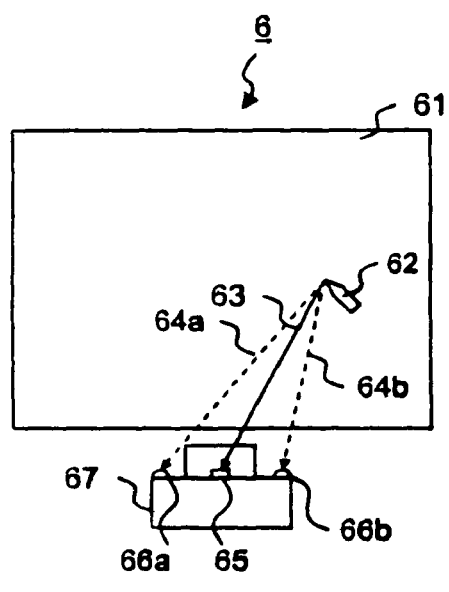
FIGS. 5A and 5B are schematic views of an electronic whiteboard system (projector system) using an ultra-short focal length projector.
Figure 5B:
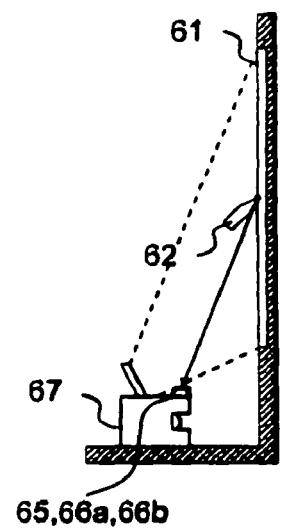

In this way, according to the third embodiment, since the pressing bodies are supported by pendulum-like structures, pressure is applied to a part of the ultrasonic wave transmitter, i.e., to vertically upper portions, and an ultrasonic wave can be prevented at these portions. The third embodiment is effective for an electronic whiteboard system having an ultrasonic wave sensor that is arranged at a lower position and away from the projection surface, as shown in FIG. 5. In particular, the influence of an undesired wave that is reflected from a ceiling, which is located in the upper direction, can be effectively reduced.

In the above-mentioned embodiments, ultrasonic wave sensors and infrared ray sensors are arranged on a screen. However, it is also possible to mount ultrasonic wave sensors and infrared ray sensors on a projector apparatus in order to calculate three-dimensionally the distance between the electronic pen on the screen and the projector apparatus, as explained in the description of the related art. In this embodiment, ultrasonic wave sensors and an infrared ray sensor may be arranged on an outer surface of the projector apparatus that faces the side of the projection, and a coordinate calculator for calculating the three-dimensional distance may be provided in the projector. The other configurations may be the same as is mentioned above.

Although certain preferred embodiments of the present invention have been shown and described in detail, it should be understood that various changes and modifications may be made without departing from the spirit or scope of the appended claims.

What is claimed is:

1. An electronic pen comprising:
  a housing comprising a longitudinal axis and a write side tip along said longitudinal axis;

at least an ultrasonic wave transmitter, said ultrasonic wave transmitter being arranged near said write side tip of said housing; and a controller for detecting a sensor orientation and for controlling a transmission of an ultrasonic wave, wherein the sensor orientation comprises a rotational orientation of said housing about said longitudinal axis, said rotational orientation indicating a predetermined direction towards an ultrasonic wave sensor for receiving the ultrasonic wave that is transmitted from said ultrasonic wave transmitter, wherein said controller selectively activates a part of said ultrasonic wave transmitter such that the ultrasonic wave is transmitted from a part of said ultrasonic wave transmitter which is directed to said sensor orientation, wherein said ultrasonic wave transmitter includes a plurality of ultrasonic wave transmitting units arranged around said longitudinal axis of said housing, said ultrasonic wave transmitting units being arranged at orientations that are different from each other, and wherein said controller comprises:
 a sensor detecting section for detecting said sensor orientation; and
 a unit selecting section for selectively triggering a part of said ultrasonic wave transmitting units such that only one of said ultrasonic wave transmitting units that is arranged at an orientation that is relatively closest to said sensor orientation is triggered, wherein said sensor orientation is detected by said sensor detecting section.

2. An electronic pen comprising:

a housing comprising a longitudinal axis and a write side tip along said longitudinal axis;

at least an ultrasonic wave transmitter, said ultrasonic wave transmitter being arranged near said write side tip of said housing; and a controller for detecting a sensor orientation and for controlling a transmission of an ultrasonic wave, wherein the sensor orientation comprises a rotational orientation of said housing about said longitudinal axis, said rotational orientation indicating a predetermined direction towards an ultrasonic wave sensor for receiving the ultrasonic wave that is transmitted from said ultrasonic wave transmitter, wherein said controller selectively activates a part of said ultrasonic wave transmitter such that the ultrasonic wave is transmitted from a part of said ultrasonic wave transmitter which is directed to said sensor orientation, wherein said ultrasonic wave transmitter is arranged to surround said longitudinal axis of said housing, and wherein said controller comprises:
 a sensor detecting section for detecting said sensor orientation; and
 an ultrasonic wave limiter for limiting an operation of a part of said ultrasonic wave transmitter, wherein the part is positioned at an orientation that is relatively away from said sensor orientation, wherein said sensor orientation is detected by said sensor detecting section.

3. The electronic pen according to claim 2, wherein said ultrasonic wave limiter comprises:

a plurality of pressing bodies arranged around said ultrasonic wave transmitter at orientations that are different from each other;

a pressing body selecting section for selecting said pressing body that is positioned at the orientation that is relatively away from said sensor orientation, wherein said sensor orientation is detected by said sensor detecting section; and pressing body driving sections for pressing respective pressing bodies against said ultrasonic wave transmitter, wherein said pressing body is selected by said pressing body selecting section.

4. An electronic pen comprising:

a housing comprising a longitudinal axis and a write side tip along said longitudinal axis;

at least an ultrasonic wave transmitter, said ultrasonic wave transmitter being arranged near said write side tip of said housing; and a controller for detecting a sensor orientation and for controlling a transmission of an ultrasonic wave, wherein the sensor orientation comprises a rotational orientation of said housing about said longitudinal axis, said rotational orientation indicating a predetermined direction towards an ultrasonic wave sensor for receiving the ultrasonic wave that is transmitted from said ultrasonic wave transmitter, wherein said controller selectively activates a part of said ultrasonic wave transmitter such that the ultrasonic wave is transmitted from a part of said ultrasonic wave transmitter which is directed to said sensor orientation, wherein said ultrasonic wave transmitter is arranged to surround said longitudinal axis of said housing, and wherein said controller comprises:
 a plurality of pressing bodies that are arranged around said ultrasonic wave transmitter at orientations that are different from each other; and
 supporting members for supporting said respective pressing bodies such that said pressing bodies are free to move in a vertically downward direction and that at least one of said pressing bodies presses said ultrasonic wave transmitter, wherein at least one of said pressing bodies is positioned near a vertically upward part of said write side tip.

5. An electronic pen comprising:

a housing comprising a longitudinal axis and a write side tip along said longitudinal axis;

at least an ultrasonic wave transmitter, said ultrasonic wave transmitter being arranged near said write side tip of said housing;

a controller for detecting a sensor orientation and for controlling a transmission of an ultrasonic wave; and an infrared ray transmitter for transmitting an infrared ray in synchronization with a transmission of an ultrasonic wave that is transmitted by said ultrasonic wave transmitter, wherein the sensor orientation comprises a rotational orientation of said housing about said longitudinal axis, said rotational orientation indicating a predetermined direction towards an ultrasonic wave sensor for receiving the ultrasonic wave that is transmitted from said ultrasonic wave transmitter, and wherein said controller selectively activates a part of said ultrasonic wave transmitter such that the ultrasonic wave is transmitted from a part of said ultrasonic wave transmitter which is directed to said sensor orientation.

6. A projector system comprising:

the electronic pen according to claim 5; and a projector apparatus which is configured to project an image onto a writing surface, information being written on said writing surface by said electronic pen, wherein said projector apparatus comprises:
- at least two ultrasonic wave sensors;
- at least one infrared ray sensor for receiving the infrared ray, said infrared ray sensor being arranged adjacent to each ultrasonic wave sensor; and
- a coordinate calculator for calculating three-dimensional coordinates of said electronic pen by calculating a difference, between a time at which the infrared ray is received by said infrared ray sensor and a time at which the ultrasonic wave is received by said ultrasonic wave sensor, for each ultrasonic wave sensor.

\* \* \* \* \*